United States Patent [19]

Colens

[11] Patent Number: 5,787,545
[45] Date of Patent: Aug. 4, 1998

[54] AUTOMATIC MACHINE AND DEVICE FOR FLOOR DUSTING

[76] Inventor: André Colens, rue du Baillois 5, Rixensart, Belgium, B-1330

[21] Appl. No.: 765,190
[22] PCT Filed: Jul. 4, 1995
[86] PCT No.: PCT/BE95/00065
  § 371 Date: Jan. 2, 1997
  § 102(e) Date: Jan. 2, 1997
[87] PCT Pub. No.: WO96/01072
  PCT Pub. Date: Jan. 18, 1996

[30] Foreign Application Priority Data

Jul. 4, 1994 [BE] Belgium .................. 9400629

[51] Int. Cl.⁶ ..................................... A47L 9/28
[52] U.S. Cl. .................. 15/319; 15/339; 15/340.1; 15/352
[58] Field of Search .................. 15/339, 340.1, 15/319, 352

[56] References Cited

U.S. PATENT DOCUMENTS

| | | | |
|---|---|---|---|
| 4,700,427 | 10/1987 | Knepper | 15/340.1 X |
| 4,756,049 | 7/1988 | Uehara | 15/340.1 |
| 5,109,566 | 5/1992 | Kobayashi et al. | 15/340.1 X |
| 5,293,955 | 3/1994 | Lee | 15/319 X |
| 5,341,540 | 8/1994 | Soupert et al. | 15/319 |
| 5,369,347 | 11/1994 | Yoo | 15/319 X |
| 5,440,216 | 8/1995 | Kim | 15/340.1 X |
| 5,497,529 | 3/1996 | Boesi | 15/319 |
| 5,568,589 | 10/1996 | Hwang | 15/319 X |
| 5,634,237 | 6/1997 | Paranjpe | 15/340.1 X |

FOREIGN PATENT DOCUMENTS 4-96719  3/1992  Japan .................... 15/319

OTHER PUBLICATIONS

"Kitchen of Tomorrow to visit USSR", Washington Post, Feb. 10, 1959, p. B8.

*Primary Examiner*—Chris K. Moore
*Attorney, Agent, or Firm*—Leonard Bloom

[57] ABSTRACT

The invention relates to a floor dusting device comprising a self-contained mobile machine provided with two wheels and a suction means, a dust-container, an obstacle avoiding and detection means and an electronic control unit having a microprocessor. The device is also provided with a central device for discharging the dust, said device being stationary and associated to a guiding means enabling the mobile self-contained machine to reach the central dust and discharge device for emptying periodically the dust container. The device is also comprised of a charging unit integrated to the central device to recharge the rechargeable batteries contained in the mobile machine. The microprocessor is associated to an algorithm for avoiding the obstacles and searching the central suction device and the charging unit.

11 Claims, 6 Drawing Sheets

AUTOMATIC MACHINE AND DEVICE FOR FLOOR DUSTING

The present invention is directed to an arrangement and an automatic system for floor dusting based on a self-contained machine moving over a floor surface.

Preferably, the machine is continuously operative, that is to say that, once the arrangement has been installed, the user must no more intervene for actuating or interrupting the floor dusting operation, these functions being automatic. According to a particular embodiment of the invention, the machine is permanently activated. It may be provided with a unit, advantageously a programmable unit, initiating or interrupting the operation according to time-tables or other parameters (noise, luminosity etc . . . ).

The device and the system according to the invention are indeed based on the use of a mobile robot of low power and of small dimensions running over the surface to be dusted in a random or quasi-random way. The robot is associated to a central device for discharging the dust, where the mobile robot will periodically empty itself from the dust. It is also provided, preferably integrated to the central discharging device, with a recharging unit for recharging the battery(ies) of the mobile robot allowing in that way the start of a new operating cycle.

In the following description, the reference to a system or central suction device or a central vacuum cleaner include all equivalent systems or devices, for discharging the dust from the dust collector of the mobile robot, including devices based on the opening of a discharge outlet combined with the simple gravity effect.

According to a embodiment of the invention, the recharging device is a induction based supplying device.

Also, according to another embodiment compatible with the above mentioned one, the device locating the central suction and recharging unit uses an algorithm based on the field gradient.

The fixed station comprises then a central suction device provided with a collecting container of sufficient capacity, a high frequence generator, for example 20 KHz, an induction coil, and an electronic control module.

According to an embodiment, the robot is provided with an external casing in the form of a approximately semi-spherical shell, or in the form of a flattened dome, mounted on springs attached to a internal chassis supporting the other components of the mobile robot. This assembly will lead to a sturdy device since a user may for example step on the casing without damaging the internal components. The casing, under the exerted pressure, will indeed go down and rest on its internal periphery contacting the floor.

The casing has for example a length of 15 cm and a width at the base of 30 cm. It may advantageously be made of polyester. The weight of the device may be less than 2 kilogram, including a battery of approximately 500 g.

According to an embodiment of the invention, the mobile robot comprises a casing and a chassis, the latter supporting, independently or not, at least:
- at least a wheel or advancement member such as preferably, two lateral driving wheels driven by at least one, preferably two motors, each motor being controlled independently in such a way as to allow for the control the direction of movement of the robot
- a suction unit located under the casing
- a dust collecting container of small capacity located in the inside of said casing
- a microprocessor based control unit
- a rechargeable battery
- a receiving coil for the induction recharging
- a system for detecting and avoiding an obstacle, by detecting the impact, said system being comparable to the one described for a robotic lawnmower in patent application WO 92/04817.

For domestic applications, the power of the fan in use may be such that it does not exceed 5 to 10 Watt and the power for the motors actuating the wheels may be such that it does not exceed 2 to 3 Watt. Preferably, the maximum power of the device will not exceed 100 Watt, preferably 50 Watt and will generally be less than 25 Watt.

For more demanding applications, for example the removal of dust on an industrial surface, the power may exceed 800 Watt.

According to a particularly advantageous embodiment, the mobile robot will move continuously over the surface to be cleaned by actuating two wheels, the third supporting point being advantageously the suction inlet located in a off center position with respect to the central vertical axis, rearwards or preferably frontwards with respect to the direction of movement. Both independent driving wheels, possibly as well as the associated motors, are located approximately on one side and the other side of the central portion of the chassis.

According to one embodiment, the suction inlet will rub against the floor surface. Its particular design may thus be similar to the suction inlet of traditional domestic devices and, for example, may comprise interchangeable elements.

According to another aspect of the invention, the suction inlet or one of the element adapted to it, may be provided with one or two small rollers, maintaining the inlet slightly above the floor's level, possibly with a means for adjusting the height.

The free movements of the robot are limited by the physical obstacles present over and around the surface. There may be provided a more elaborate system for delimiting the surface, with a peripheral wire supplied by a signal as described in the patent WO 92/04817 for a robotic lawnmower.

The robot may also advantageously be provided with a floor level drop detector allowing it to move back if the drop is above a certain value, more particularly near a step of a descending stair. For that purpose a sensor arm provided at its free end with a roller may be provided in front of each wheel. The arm is fixed to the chassis and may pivot vertically. When a substantial drop in the surface level is present in front of one of the wheel, the arm will drop by gravity and the resulting pivoting arm movement will actuate a switch which provokes the reversing of the robot and a turning, the algorithm being similar to the one provided for the obstacle detection.

According another embodiment of the invention, there is provide a means for detecting the flow of the sucked dust. The detecting means may consist in a measuring system of the absorption and/or of the reflection of a light ray crossing the suction nozzle of the machine. The amount of sucked dust may be a parameter taken into account by the algorithm of the microprocessor in order to make a choice regarding the path to be followed. If the dust amount is substantial the robot's path will be automatically adapted for covering the surface with a high quantity of dust. This algorithm may be similar to the one resulting from the detection of a lawn portion with high grass such as described in the patent application WO 92/04817 already cited.

According to an embodiment, there is provided for the detection and the quantitative measurement of the sucked dust a device emitting a light ray and a device receiving a light beam, both located at the level of the suction nozzle, between the suction inlet and the dust collector. Depending on the relative locations of the receptor (within or not the axis of the emitted beam), the absorption or the reflection will be measured. For the reflection, the emitting and receiving device may be on the same side of the nozzle, more or less juxtaposed. There has been observed that this latter arrangement is particularly efficient for the quantitative appreciation of the sucked dust flow.

According to a preferred embodiment of the invention, in use, the robot may be in four distinct states:

- in a normal mode, the battery is enough charged and the operating robot moves and sucks the floor's dust found on its way, via the suction inlet provided under its casing. The suction is obtained by a suction means, preferably a fan such as a radial fan. The sucked air is filtrated by a traditional filter then rejected through a side or top opening provided in the casing. The dust and the small debris are collected in known way in a container or an equivalent means such as a bag.
- when the level of charge of the battery drops under a predetermined value, the robot will switch to a second state. In this case the fan is stopped and the robot places itself in a mode for searching the recharging unit, which is preferably functionally coupled with a central vacuum suction apparatus. The operation is performed according to a search algorithm memorised in the electronic control system.
- after having been positioned on the mounting plate of the central vacuum suction apparatus a third state is automatically actuated. The central suction apparatus detects the presence of the robot on its base. This detection may be performed by the control module as resulting from the damping of an induction coil in the case where the robot and the recharging unit are provided with the appropriate devices. The central vacuum unit will operates for a few seconds in order to empty the collecting container of the robot via the disposal opening and the sucking orifice located in the stationary plate being present under the robot
- in a fourth state, the suction unit is stopped but the robot goes on for its recharging process via the induction coil until the measurement of the level of charge sent to the microprocessor indicates enough charging.

The robot will revert then to the first mentioned state, leaving the central suction and recharging unit, moving and starting in that way a new cycle for dusting the floor.

The central suction unit, generally more powerful than the suction unit present in the robot, is connected to the electric mains of the corresponding building and is advantageously movable from one place to the other. According to another embodiment, it may be incorporated or imbedded in a furniture or in a wall.

It is understood that the arrangement according to the invention may involve several mobile robots. The latter are able to operate independently, in the less sophisticated cases, by passing through the above mentioned operating steps.

The surface to be cleaned may be a wood floor, a tiled floor, a synthetic flooring, with or without rugs, or a carpeted surface. The surface may be part of several communicating rooms including a stairhead. The arrangement will be more advantageously used in an apartment.

The localisation by the robot of the recharging unit and of the central suction unit may necessitate, in some cases, a guiding system, for example involving the use of wires. Numerous wire-guiding systems are known.

According to another aspect of the invention, particularly preferred, there is however provided a self-contained mobile robot able to resupply without having to physically connect to a power supplying source, without necessitating a precise positioning and by using the source itself as a positioning and guiding system for the energy re-supply.

According to the invention, the mobile and self-contained robot is fitted with a computer and a circuit measuring the intensity of an oscillating field produced by the energy source itself. The intensity measurements are sent to the computer which applies a particular algorithm, in order to provide the necessary instructions to the organs controlling the movement of the device. On the basis of the intensity variation along its path, the robot, according to the invention, is able to steer itself.

The supply system comprises a fixed station with a generator of HF alternative current connected on one side to an electric current source, for example the public network at 220 V, and on the other side to an induction coil located on or under the plate of the central suction unit. This generator may operate permanently with a very weak loss if no source of induced current, is located nearby. The frequency may be of 20 KHz. The diameter of the induction coil varies from 10 to 20 cm.

In this embodiment, the robot is equipped with a pick-up coil located in its lower portion and a pick-up circuit tuned on the frequency of the alternative current of the fixed supplying system.

The robot is provided with an induced current filtering and rectifying device. The latter current comes from the pick-up coil and the device allows for the recharge of a battery. These devices are well known.

When the recharging operation is over, the algorithm for performing the work specific to the robot will take over the operation until a new exhaustion of the rechargeable battery is detected.

The system according to the invention may be applied in several ways.

According to a first embodiment, the plane of the induction coil is perpendicular with respect to the plane of movement of the device.

The pick-up coil is located at the front of the mobile device. The axis of the coil is located on the axis of movement of the device.

The device comprises a computer which analyses, among others, the level of charge parameter of the rechargeable battery. When the latter must be resupplied, a particular algorithm takes the control of the movements of the device.

According to the algorithm, the device operates a 360° turn. The voltage of the pick up coil will pass by a maximum when the axis of the device (and of the coil) will be directed towards the induction generator, also perpendicular to the plane of movement of the device.

The device will move along this axis, randomly either in the direction of the source or in the opposite direction. In the latter case, the detected gradient is negative and the algorithm will be planned for a 180° rotation that will inevitably lead the device on the right track in order to approach the emitting source which is also the energy supplying source.

The signal coming from the pick-up coil is constantly analysed by the computer located in the robot. The computer controls the driving wheels in such a way as to steer the device towards the generator, taking into account the gradient of the emitted signal. The robot will stop when the received signal is sufficient in order to permit the recharge of the battery.

According to a second embodiment of the invention, the plane of the induction coil is parallel to the plane of movement of the device. The induction coil may be located on the floor or placed under the surface of movement, preferably in a location far from obstacles that may be present on the surface of movement of the device.

The pick-up coil is placed under the mobile robot in the plane of movement, preferably as close as possible to the floor (a few centimeters). When the robot is moving in direction of the generator, the machine will cut the equipotential lines of the emission perpendicular to the latter and the field will increase, even more so as the machine approaches the generator. If the direction is not perpendicular to the equipotential lines, the gradient will inevitably decrease at a given time.

When the robot moves parallel to the equal intensity lines, the field is practically constant, the intensity of any possible small variations being less than the background signals. The computer analyses the absolute value of the field and its gradient in respect of the progress of the robot. The computer may direct the robot to the generator and stop it when the field intensity is at its maximum.

So, the robot being in movement, when the measured field at given intervals of time is practically constant (gradient less than a predetermined value), the algorithm will cause a 90° rotation of the robot towards one or the other side. If the measured gradient is negative, the robot will operate a second rotation, this time of 180°. The gradient is then positive up to a predetermined maximum where the generator is located, or to a minimum (constant value) when it is tangent to a line of force. This second case will happen more frequently due to the lack of precision of the measurements of the field, and to a lesser extent to the lack of precision of the performed rotations or of the path being followed. In this case, a new rotation of 90° is effected and the cycle may start again until a new predetermined value appears. In practice, the robot reaches the resupplying station by successive approximations.

In the aforementioned embodiments, the algorithm takes into account other factors such as the signals for the limits if present, or the obstacles which will have a priority status on the simplified algorithm described above.

In order to obtain an optimal transfer of power between the transmitting coil and the pick-up coil, the exact positioning of the mobile device with respect to the induction supplying system will be based on two measurements:

- a measurement of the induced field A1 (square root of the measure of the induced fields) in the pick-up coil as effected by means of a selective circuit, of high gain, centered on the oscillation frequency of the supplying circuit permitting the measurement of the signal at long distance (several tens of meters)
- a measurement of the charging current A2 supplied by the pick-up coil.

The charging current is measurable only when both coils are very close that is to say when the mismatch of one in respect of the other does not exceed their diameter.

The device's computer will take into account a combination of A1 and of A2 in order to estimate the absolute value of the field A=A1 +A2.

The combination of both values allows for a long distance detection together with a precise positioning for the superposition of both coils.

The field gradient, that is to say the variation on a certain distance, is inversely proportional to the square of the distance separating the mobile device and the supplying source.

To offer a uniform resolution, whatever the distance of the engine to the supplying source, the measurements of the field are effected at distance intervals whose lengths are proportional to the distance separating the device from the source.

For example
  if A max=500 d min=2 cm d=1000 cm: A
  if A=10 d=1m (far from the source, around 10 meters)
  A=100 d=10 cm (near the source, around 1 meter)
  A=350 d=3 cm (both coils are partially superposed with an offset).

It is understood that the algorithm may be amended in order to be adapted to complex configurations of the obstacles (furniture) and limits of the surface to be dusted.

So, occasionally the robot may be separated from the fixed station by a wall. The obstacle detector will of course have priority on the approach process towards the fixed station. In this case there may be provided a procedure wherein the robot will follow the wall, while regularly executing positioning tests, until the line to the station is no more crossing an obstacle.

It is to be noted that other orientation systems may be applied in order for the robot to position and steer itself to the recharging unit. In the case of certain constructions with metallic frame, it may be advantageous to use an orientation and guiding system based on infrared light, with appropriately located transmitter and one, or preferably, two infrared detectors, located over the robot, detector which will send the corresponding measurements to the microprocessor. It is particularly advantageous to provide a system wherein the long distance orientation and guiding system is based on the infra-red device, while for shorter distances the system is based on an induction device as described above.

The invention will be better understood with reference to the annexed drawings, given by way of example only, wherein.

Figure 1:
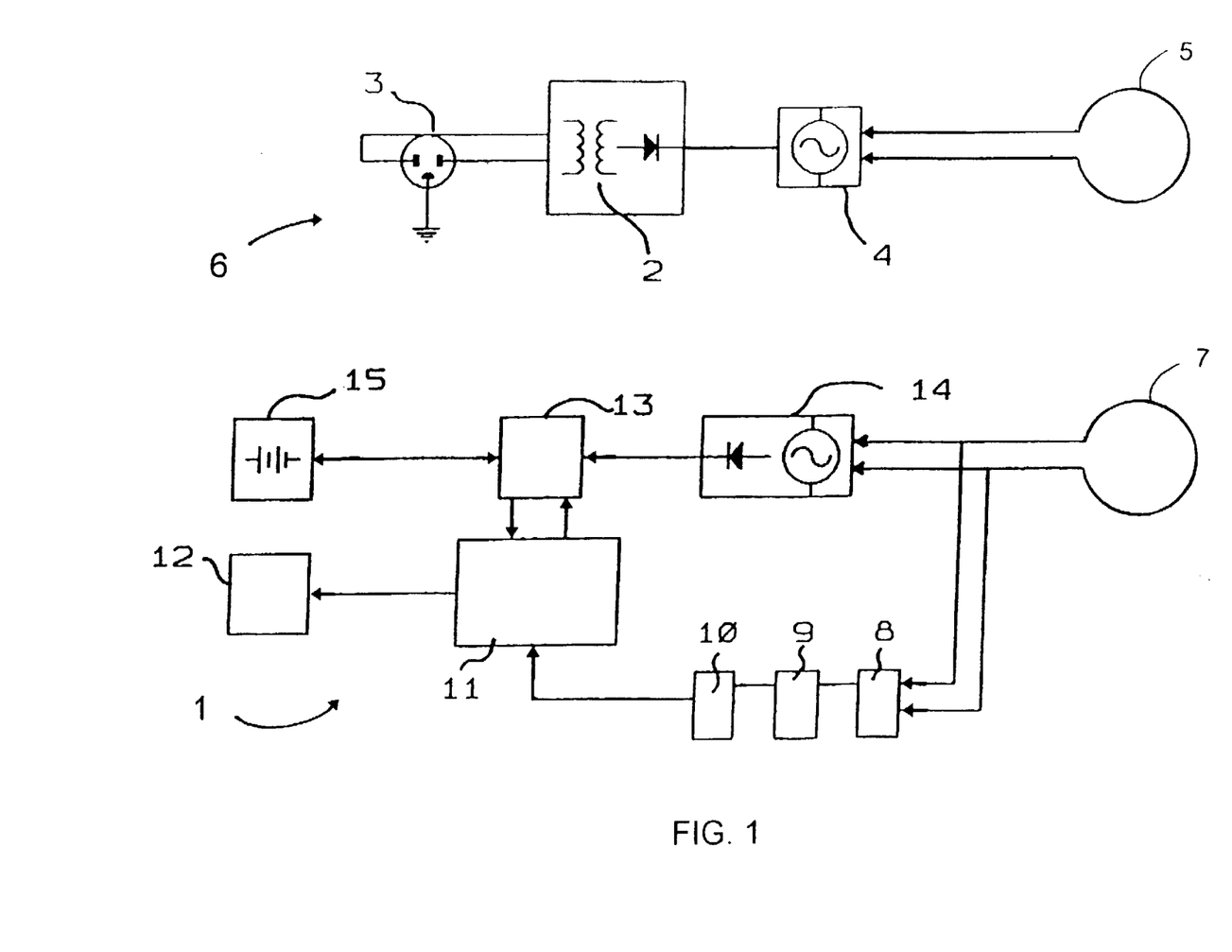
FIG. 1 shows the circuit for the fixed supplying station and the complementary circuit of the mobile device.

FIG. 1 is a schematic plan view illustrating on one side the fixed station 6 and on the other side the self-contained robot 1. The fixed station 6 comprises a rectifier 2 connected to the main network 3 at 220 V. The continuous current supplies an oscillating circuit 4 of 20 KHz connected to an induction coil 5 located a few centimeters under the receiving pedestal plate.

The self-contained robot 1 comprises a pick-up coil 7, the pick-up circuit comprising itself a filtering unit 8, a amplifier 9 and an analog to digital converter 10, connected to a microprocessor 11. The microprocessor is itself connected to a steering control unit 12 and the supply control 13 is connected to the pick-up coil on one side and to the battery 15 on the other side in order to recharge the latter.

Figure 2:
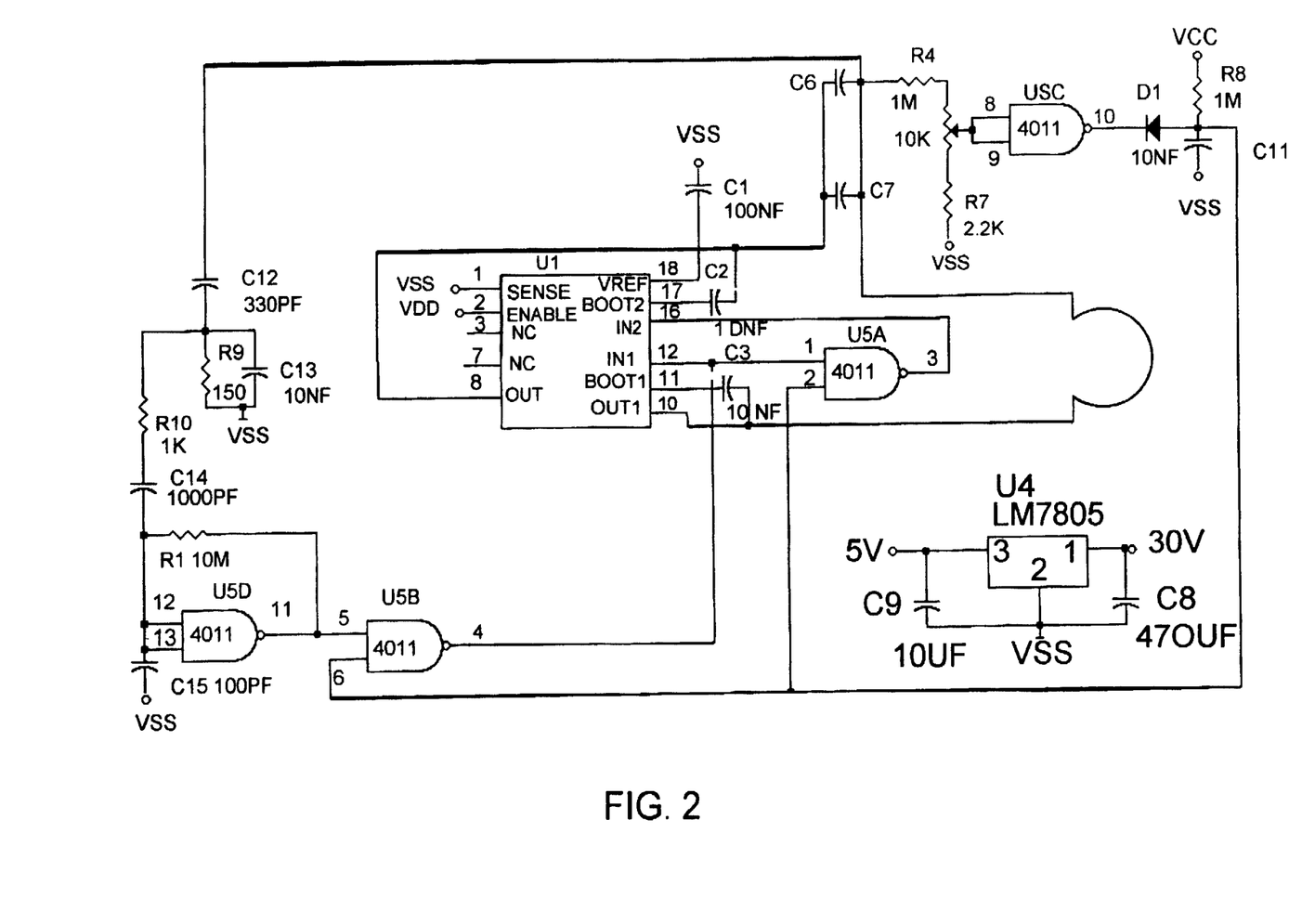
FIG. 2 is a schematic electronic diagram illustrating an oscillating circuit-transmitter such as the one used according to the arrangement of FIG. 1.

FIG. 2 represents schematically an example for the oscillating circuit-transmitter according to the second embodiment. In this particular case, the frequency of the oscillator is 25 KHz, the diameters of the coils are 20 cm, the number of turns of the coil of the fixed station is 70 (diameter of the wire is 0.8 mm), the number of turns for the mobile station is 14. The distance between the coils during the charging operation is 4 cm. The charging current is 750 mA (corresponding to an average recharging time for a battery of 12 V, during 1 to 2 hours). The charging voltage is then 13.5 V.

Figure 3:
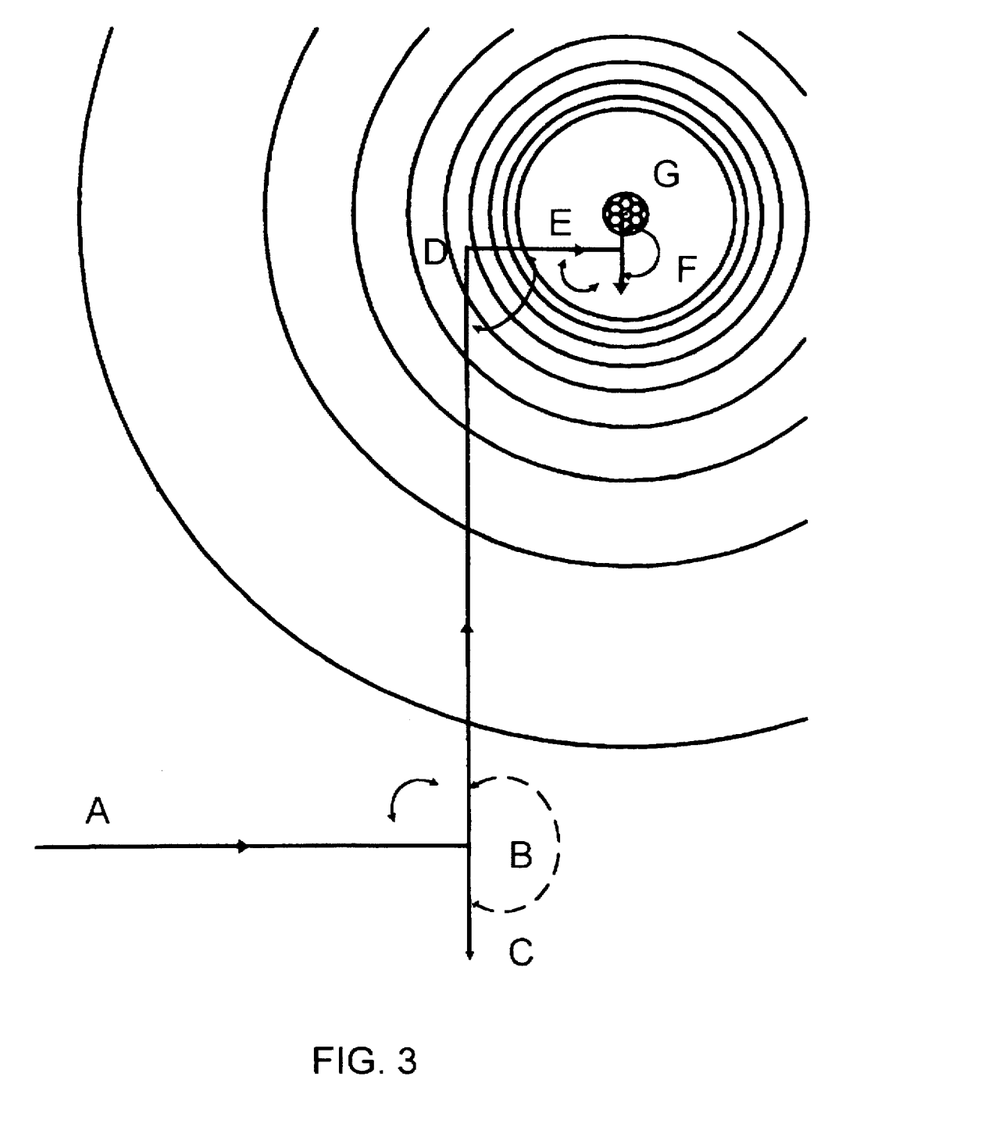
FIG. 3 illustrates the positioning algorithm as used in the second embodiment according to the invention.

FIG. 3 is a plan view which illustrates the circles of equal field intensity and the algorithm followed by the self-contained robot in order to reach the fixed station. In this example, the robot will reach the charging position after three 90° turnings, with two corrections of 180° when the direction followed is opposite to the one leading to the position of supply. The path being followed passes through points A,B,C,B,D,E,F,E before arriving to the recharging station G.

Figure 4:
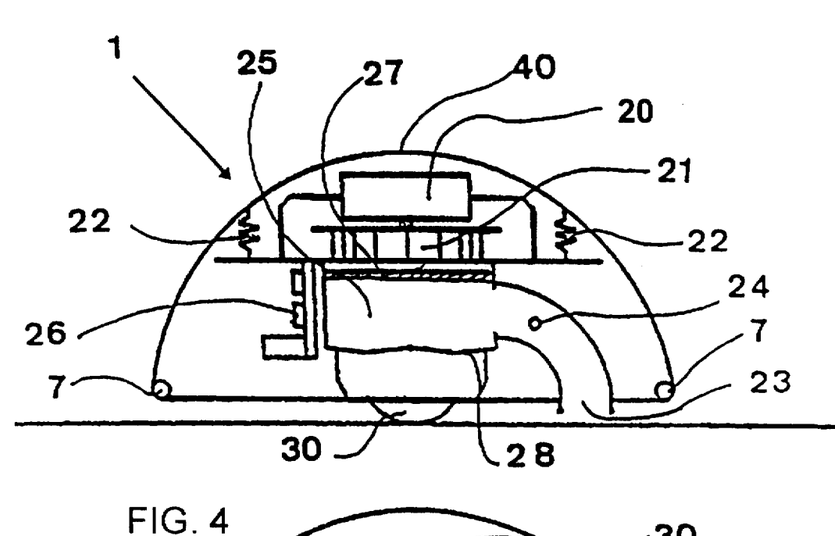
FIG. 4 is a schematic sectional view of the mobile machine according to the invention.

FIG. 4 is a sectional schematic view illustrating the different components of the mobile suction machine which is part of the present invention. The machine comprises essentially three motors 32, 32' and 20 for actuating respectively both wheels 30 and 30' located on each side with respect to the direction of movement of the machine and on the turbine 21 of the suction device. The approximately hemispheric casing 40 is supported and secured to the chassis by, in the illustrated exemple, two springs 22. There is also provided a suction filter 27, a dust container 25 with at its bottom discharging flaps 28, for example mounted with springs. The suction opening is located under the machine at the inlet of a suction nozzle connected in a known way to the dust container and to the air pumping turbine. The sucking nozzle comprises an optical dust detecting device allowing an estimation of the quantity of sucked dust. This device may comprise a measure of the absorption or of the reflection of a light beam crossing the nozzle of the machine. The sucking nozzle may be provided with, in a conventional way, various accessories adapted to the type of surface to be cleaned (brushes etc ...) The machine is fitted with a control circuit 26, as more detailed elsewhere, and with a pick-up coil 7 located at the lower periphery of the casing with flexible connection to the central chassis.

Figure 5:
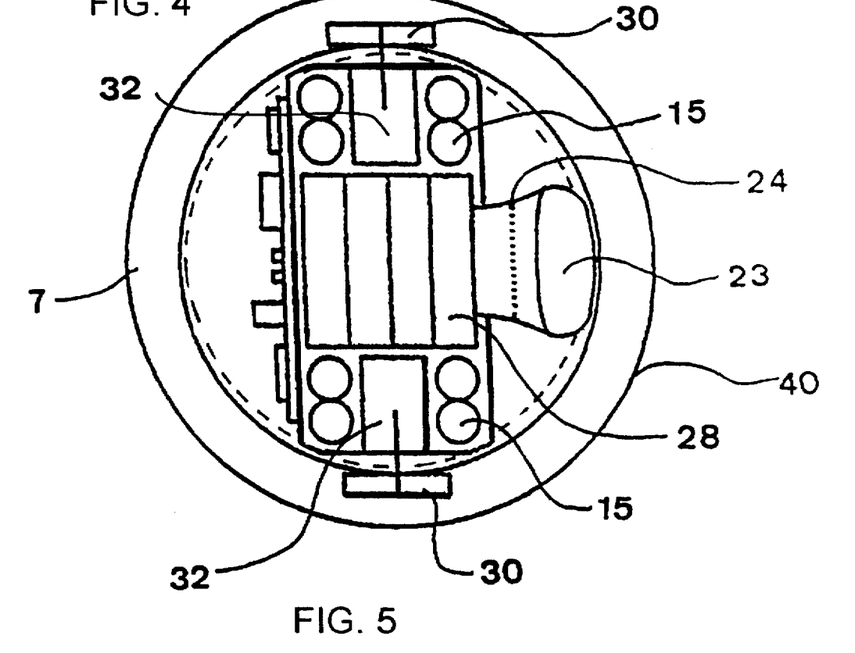
FIG. 5 is a top plan view of the mobile machine according to the invention.

FIG. 5. is a top plan view of the mobile machine of FIG. 4 illustrating furthermore the rechargeable batteries 31.

Figure 6:
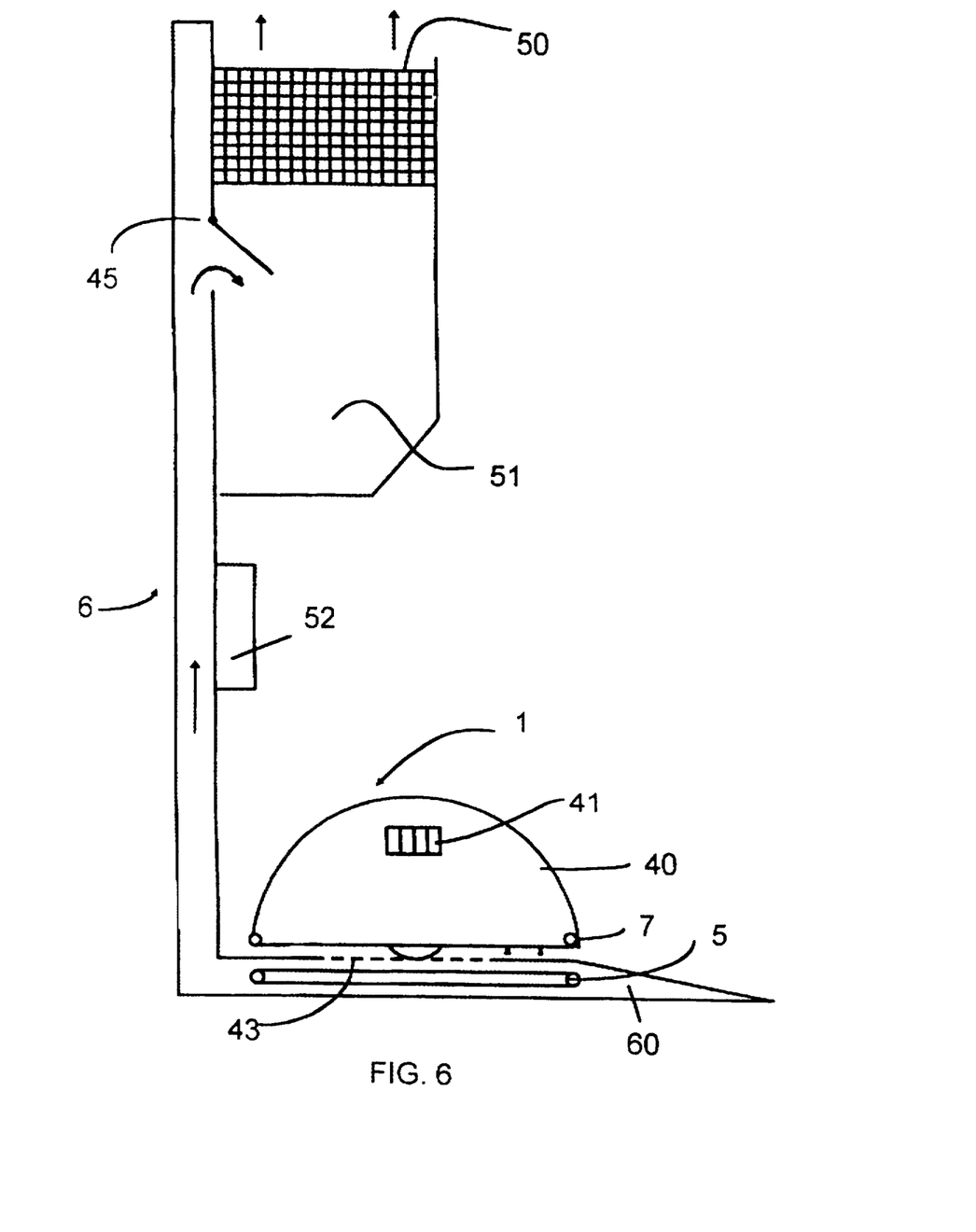
FIG. 6 illustrates the central recharging and suction unit.

FIG. 6 illustrates the central recharging and suction fixed device 6 which comprises a pedestal plate 60, accessible to the mobile machine. The latter comprises a shell shaped housing provided with a delivery grid associated with the pumping turbine 21. The plate is fitted under its receiving surface with a horizontal induction coil 5 functionally adapted to the induction coil 7 of the mobile machine 1 when the latter is present, as well as with a suction grid 43 with a conduit connected, via a conduit 44 and a flap 45, to a central suction unit 50 fitted with a main dust container, possibly removable and/or dischargeable. The fixed station is supplied by the mains. At 52 the control module and the supplying circuit for the discharging device are illustrated.

Figure 7:
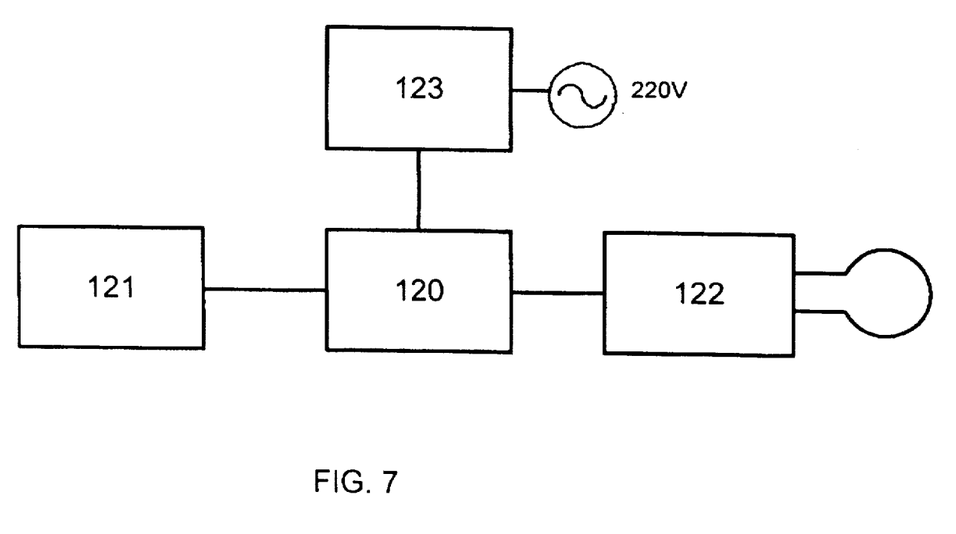
FIG. 7 illustrates in a schematic and simplified way the function of the central recharging and suction device.

FIG. 7 is a block diagram of said control device and supplying circuit for the discharging device showing at 120 a control module comprising the required logic for the detection of the presence of the robot on the charging location, the programming of the suction time of the fixed suction device, the control and the checking of the operation of supply by induction. At 121 there is represented the start relay for the fixed suction device controlled by the module 120. At 122 there is represented the induction supply and at 123 the supply of the electronic parts by the mains.

Figure 8:
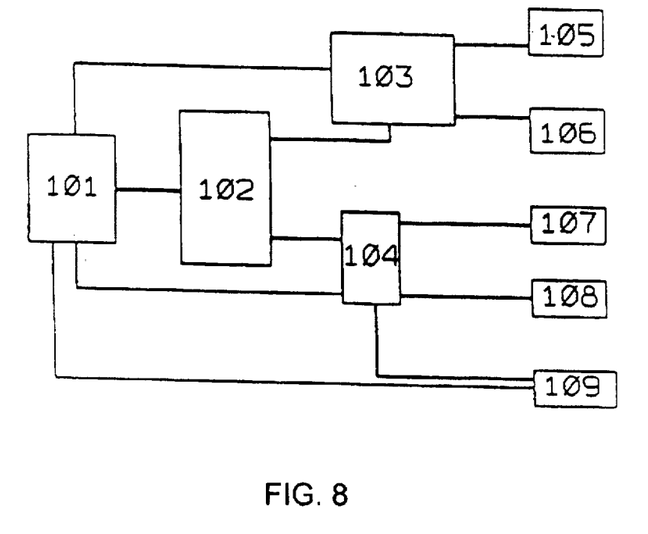
FIG. 8 illustrates in a schematic and simplified way the functions of the modules included in the mobile machine.

FIG. 8 is a block diagram illustrating in a schematic and simplified way the functions of the module fitted in the mobile machine. At 101, there is represented the acquisition module for, among others, the battery voltage, the charging current, the positioning detection signal, the speed of the wheel and the dust density. A control microprocessor 102 is provided wherein the program corresponding to the various states of the robot is stored. At 103 there is illustrated the command module of the supplying system comprising the control battery 105 and the recharging system control. There is furthermore indicated the induction supply at 106, the driving and suction motors control module at 104, the right driving motor at 107, the left driving motor at 108 and the fan motor at 109.

There will be noted that the mobile robot according to the invention may be fitted with an anti-theft system, that will, for example, send signals, sounds or electromagnetic signals, as soon as it is no more in close contact with the floor or as soon as it is moved beyond a certain perimeter.

The invention is not limited to the various above mentioned embodiments which may varied in their details and constructions.

I claim:

1. Arrangement for dusting a floor comprising at least a self contained mobile machine, a central stationary recharging unit and a central unit for discharging the dust the self-contained mobile machine having a casing containing therein rechargeable batteries, a means for suction cleaning for picking up dust and debris, a dust container for collecting said dust and debris, a means for detecting and avoiding an obstacle and an electronic control unit comprising a microprocessor, the central stationary recharging unit, for recharging the rechargeable batteries contained within the mobile machine, said unit having a first guide means for guiding said self-contained mobile machine to the recharging unit for a recharging operation the microprocessor being able to perform an algorithm for operating said means of avoiding the obstacles and searching for the recharging unit wherein said arrangement comprises the central unit for periodically discharging the dust from said dust container being stationary and having second guide means for guiding said self contained mobile machine to the unit for periodically emptying the dust container.

2. Arrangement for dusting a floor according to claim 1 wherein the central dust discharging unit and the recharging unit are located at the same location and integrated one with another, the first and second guide means being one and the same.

3. Arrangement for dusting a floor according to claim 2 wherein the guide means comprises a transmitter of infrared light.

4. Arrangement for dusting a floor according to claim 1 wherein the central unit for discharging the dust comprises a suction unit.

5. Arrangement for dusting a floor according to claim 1 wherein the operation for recharging the batteries is performed by induction.

6. Arrangement for dusting a floor according to claim 1 wherein the self contained mobile machine comprises a means for detecting a sudden drop in the level of the floor.

7. Arrangement for dusting a floor according to claim 1 wherein the machine comprises a means for detecting the instantaneous density of sucked dust at the nozzle and that the latter parameter is included in the algorithm for steering the machine in order to better remove a high quantity of dust from a surface.

8. Arrangement for dusting a floor according to claim 1 wherein the machine has a means for detecting the instantaneous density of sucked dust at the nozzle and that the latter parameter is included in the algorithm for adapting the path of the machine in order to better remove a high quantity of dust from a surface, and characterized in that the means for detecting the sucked dust density comprises an optical device for measuring the absorption and/or the reflection of visible light crossing the suction nozzle of the machine.

9. Mobile machine for dust suction cleaning of the floor comprising a casing and a chassis, the latter being fitted with at least:

- at least two side driving wheels each wheel driven by a respective motor, each motor being independently controlled in order to direct the machine
- a suction unit located under the casing for picking up dust and debris
- a dust collecting container of small capacity located in the inside of said casing for collecting said dust and debris from the suction unit
- a microprocessor based control unit to control the said motors
- a rechargeable battery for powering said motors
- a pick-up coil used for an induction recharging operation for the batteries
- a system for detecting and avoiding an obstacle
- a guiding system, able to direct the machine to a recharging unit wherein the mobile machine comprises also a discharging means for the dust from the dust collector, said means being automatically actuated at said recharging unit.

10. Mobile machine according to claim 9, wherein the maximum power used by the motors is 25 Watts.

11. Mobile machine according to claim 10 wherein the maximum power used by the motors is less than 12 Watts.

* * * * *